(12) United States Patent
Dickinson et al.

(10) Patent No.: US 7,979,184 B2
(45) Date of Patent: Jul. 12, 2011

(54) AUTOMATIC TRANSMISSION SOLENOID CONTROL SYSTEM AND METHOD

(75) Inventors: Michael T. Dickinson, Hilliard, OH (US); Chris Hopp, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 965 days.

(21) Appl. No.: 11/857,899

(22) Filed: Sep. 19, 2007

(65) Prior Publication Data

US 2009/0076689 A1 Mar. 19, 2009

(51) Int. Cl.
*G06F 7/00* (2006.01)
*G06F 17/00* (2006.01)

(52) U.S. Cl. .......... 701/55; 701/51; 701/52; 701/53; 701/54; 701/56; 701/57; 701/58; 701/59; 701/60; 701/61; 701/62; 701/63; 701/64

(58) Field of Classification Search .......... 701/51–64
See application file for complete search history.

(56) References Cited

U.S. PATENT DOCUMENTS

| | | | | |
|---|---|---|---|---|
| 4,106,368 A * | 8/1978 | Ivey | ............... | 477/155 |
| 4,283,970 A * | 8/1981 | Vukovich | ............... | 477/161 |
| 4,855,913 A * | 8/1989 | Brekkestran et al. | ............... | 701/66 |
| 4,989,471 A * | 2/1991 | Bulgrien | ............... | 74/336 R |
| 5,224,577 A * | 7/1993 | Falck et al. | ............... | 74/336 R |
| 5,337,871 A * | 8/1994 | Testerman | ............... | 192/85.63 |
| 5,737,979 A * | 4/1998 | McKenzie et al. | ............... | 74/731.1 |
| 5,842,375 A * | 12/1998 | Reeves et al. | ............... | 74/335 |
| 5,902,344 A * | 5/1999 | Eike et al. | ............... | 701/67 |
| 6,341,552 B1 * | 1/2002 | Potter et al. | ............... | 91/433 |
| 6,358,184 B1 * | 3/2002 | Steinmetz et al. | ............... | 477/143 |
| 6,895,798 B2 * | 5/2005 | Sosnowski | ............... | 73/1.57 |
| 7,373,234 B1 * | 5/2008 | Hwang et al. | ............... | 701/60 |
| 7,512,460 B2 * | 3/2009 | Strosser et al. | ............... | 700/282 |
| 2004/0122577 A1 * | 6/2004 | Ford et al. | ............... | 701/58 |
| 2004/0206155 A1 * | 10/2004 | Sosnowski | ............... | 73/1.72 |
| 2006/0047397 A1 * | 3/2006 | Buchanan et al. | ............... | 701/51 |
| 2006/0052959 A1 * | 3/2006 | Zhang et al. | ............... | 702/104 |
| 2009/0076689 A1 * | 3/2009 | Dickinson et al. | ............... | 701/51 |

FOREIGN PATENT DOCUMENTS

| | | |
|---|---|---|
| EP | 1 469 220 A1 | 10/2004 |
| GB | 2 051 979 A | 1/1981 |
| JP | 11182660 A | 7/1999 |
| JP | 11294622 A | 10/1999 |
| JP | 2003111487 A | 4/2003 |

* cited by examiner

*Primary Examiner* — Khoi Tran
*Assistant Examiner* — Bhavesh V Amin
(74) *Attorney, Agent, or Firm* — Mark E. Duell; Rankin Hill & Clark LLP

(57) ABSTRACT

An automatic transmission controller system and method are disclosed. In particular, disclosed is a system and method for controlling solenoid pressure control valves associated with an automatic transmission. The automatic transmission controller system comprises a controller which is configured to receive one or more electrical signal inputs for attributing each solenoid pressure control valve with one of a set of I-P calibration curves.

20 Claims, 4 Drawing Sheets

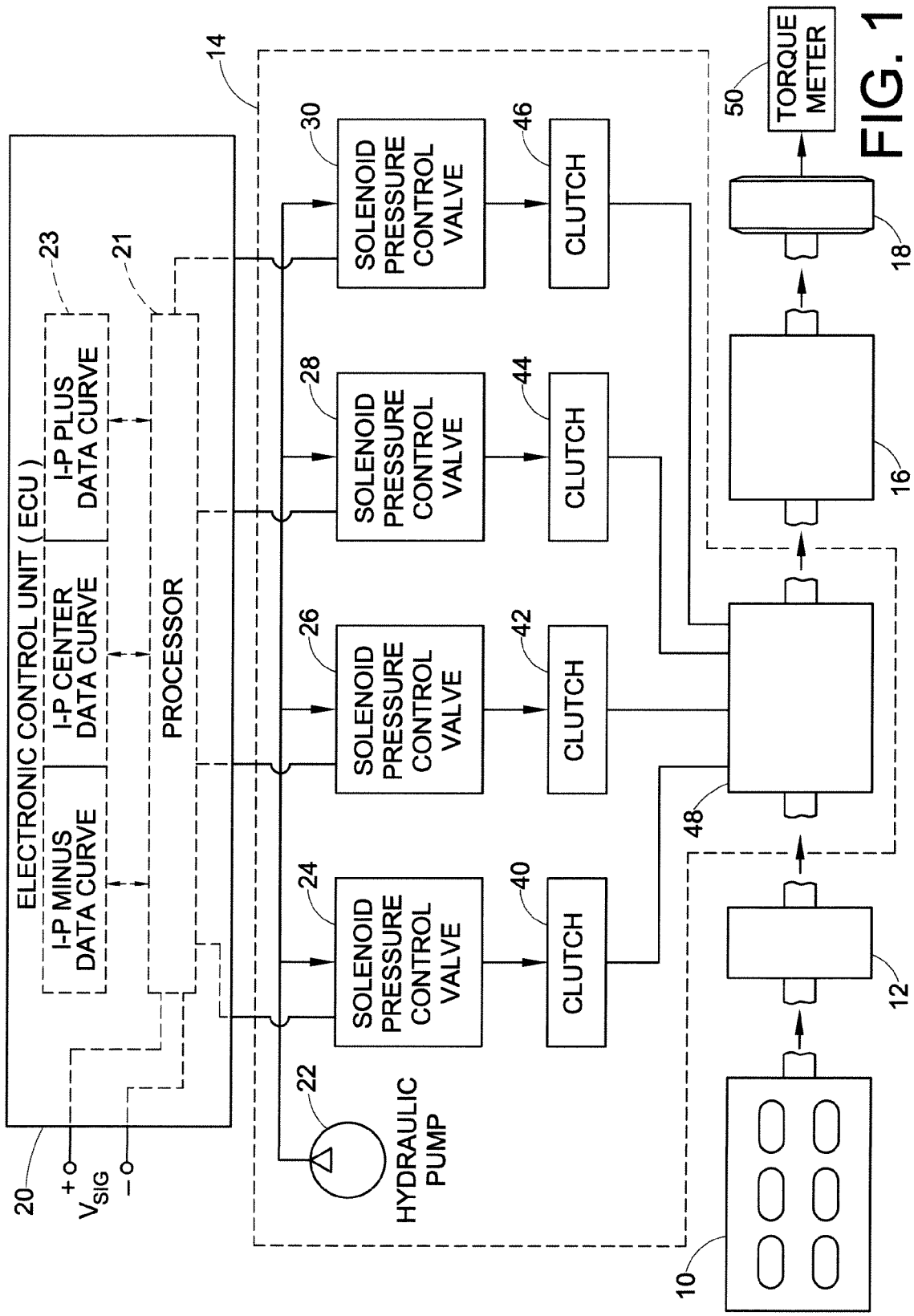

AUTOMATIC TRANSMISSION SOLENOID CONTROL SYSTEM AND METHOD

BACKGROUND

This disclosure relates to automatic transmission control for vehicles such as automobiles, trucks, etc. Specifically, the disclosure relates to the control of solenoids used to control hydraulic pressure associated with clutches for disengaging and engaging of automatic transmission gears.

Many present automatic transmissions use linear solenoids to vary the hydraulic pressure delivered to each clutch of an automatic transmission system. The solenoids have an inherent tolerance range for the amount of hydraulic pressure delivered vs. electrical current supplied to the solenoid. In other words, the amount of hydraulic pressure provided by two or more solenoids can vary for a given amount of solenoid input current. Consequently, the automatic transmission shifting algorithm parameters require calibration to account for the tolerance ranges of the solenoids.

One approach for calibrating an automatic transmission solenoid is disclosed in U.S. Patent Publication No. 2004/0206155. This publication discloses a method of calibrating a solenoid by sweeping the solenoid with increasing current from a minimum to a maximum. The hydraulic pressure output and corresponding solenoid current are recorded at preselected increments. The calibration data is stored in an electronic device and accessed by a controller to control the solenoids during execution of automatic transmission shifting algorithms.

Other present automatic transmission solenoid calibration techniques include closed loop systems to control shifting clutch actuators such as a solenoid. For example, U.S. Patent Publication 2004/0122577 discloses a closed loop control system for shifting clutch actuators.

This disclosure provides a system and method of operating and testing automatic transmission solenoids within the performance specifications of the solenoids.

BRIEF DESCRIPTION

In one aspect of this disclosure, an automatic transmission controller is disclosed. The controller comprises one or more electrical signal outputs to control the operation of one or more respective solenoids of an associated automatic transmission, wherein the said solenoids operatively control respective clutches associated with the automatic transmission; a controller memory comprising a program to control the one or more electrical signal outputs according to one of a set of controller memory stored solenoid calibration data curves; and one or more electrical signal inputs to configure the automatic transmission controller to control the electrical signal outputs according to one of the set of calibration curves.

In another aspect of this disclosure, a method of operating an electronic transmission controller and associated automatic transmission is disclosed. The method of operating comprises (a) storing in the electronic transmission controller a set of distinct I-P data curves associated with solenoid operated pressure control valve I-P operating characteristics for one or more solenoid operated pressure control valves associated with the automatic transmission; and (b) applying a first voltage signal to the electronic controller to associate a first I-P data curve with one or more solenoid operated pressure control valves, applying a second voltage signal to the electronic controller to associate a second I-P data curve with one or more solenoid operated pressure control valves, and applying a third voltage signal to the electronic controller to associate a third I-P data curve with one or more solenoid operated pressure control valves.

In another aspect of this disclosure, a method of operating a solenoid operated pressure control valve for command by an electronic controller is disclosed. The method of operating comprises (a) starting an automatic transmission shift control routine; (b) determining if there is a command to shift gears associated with an automatic transmission; and (c) controlling respective solenoids for disengagement and/or engagement of the affected gears by using one of a set of controller memory stored solenoid calibration data curves to provide the gear clutch pressures, where the set of solenoid data curves are proportionally related.

In another aspect of this disclosure, an automatic transmission controller is disclosed. The automatic transmission controller comprises a means for storing in the electronic controller a set of distinct I-P data curves associated with the solenoid operated pressure control valve I-P operating characteristics for one or more solenoid operated pressure control valves associated with an automatic transmission; and a means for applying a first voltage signal to the electronic controller to associate a first I-P data curve with one or more solenoid operated pressure control valves, applying a second voltage signal to the electronic controller to associate a second I-P data curve with one or more solenoid operated pressure control valves, and applying a third voltage signal to the electronic controller to associate a third I-P data curve with one or more solenoid operated pressure control valves.

In another aspect of this disclosure, an automatic transmission controller is disclosed. The automatic transmission controller comprises a means for starting an automatic transmission shift control routine; a means for determining if there is a command to shift gears associated with an automatic transmission; and a means for controlling respective solenoids of the automatic transmission for disengagement and/or engagement of the affected gears by using one of a set of controller memory stored solenoid calibration data curves to provide the gear clutch pressures, where the set of solenoid data curves are proportionally related.

BRIEF DESCRIPTION OF THE DRAWINGS

FIG. 1 schematically illustrates a vehicle engine, drive train and associated automatic transmission control system according to an exemplary embodiment of this disclosure;

DETAILED DESCRIPTION

Figure 2A:
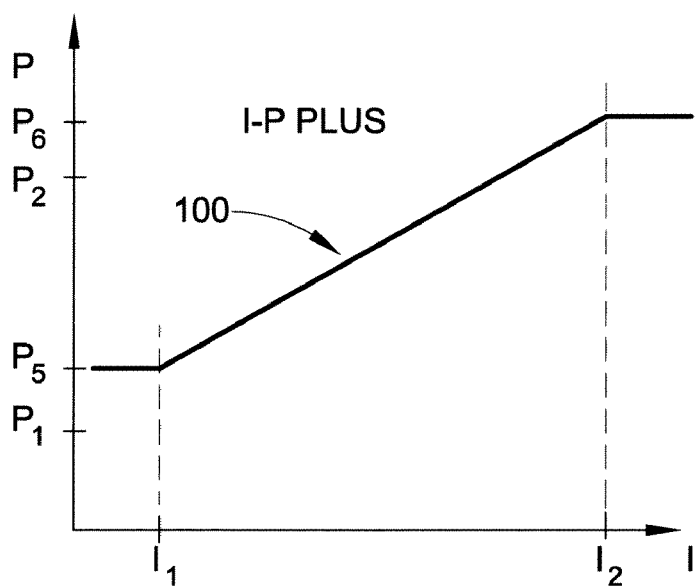
FIGS. 2A, 2B and 2C illustrate a set of solenoid I-P (current-pressure) data curves according to one aspect of this disclosure.

As briefly discussed above, this disclosure provides a system and method of operating and testing an automatic transmission. Specifically, the disclosed system and method accounts for the current pressure variances associated with solenoid actuated clutches. For example, an automatic transmission may include four substantially equivalent solenoids to actuate four independent transmission gears associated with a vehicle, i.e., first, second, third and fourth gear. Each of these four substantially equivalent solenoids have similar current-pressure performance specifications, however there are manufacturing tolerances associated with the solenoids such that there may be some inconsistencies in performance between the solenoids. In addition, variances in the automatic transmission systems coupled to the solenoids, for example the clutch, may produce additional variances between the solenoids current-pressure operating characteristics.

As will be further described below, this disclosure provides a system and method of testing and controlling automatic transmissions which utilize substantially equivalent solenoids, where one set of current-pressure (I-P) data is used by a controller to control the solenoids and associated clutches. The system and method disclosed provides a means for testing the performance of an automatic transmission within the possible range of pressures delivered to the clutches.

With reference to FIG. 1, illustrated is a schematic representation of a vehicle engine, drive train and associated automatic transmission control system according to an exemplary embodiment of this disclosure. The illustrated vehicle system comprises an engine 10, a torque converter 12, an automatic transmission 14, a driveline 16 and one or more wheels 18 which are driven or rotated by the vehicle system. Performance of the automatic transmission system is monitored and/or recorded by a torque meter 50 which may be connected to a data logger. The engine 10, torque converter 12, automatic transmission 14, driveline 16 and wheels 18 are operatively coupled via a series of shafts and coupler arrangements. In addition, an ECU/controller 20 (i.e. Electronic Control Unit) is operatively connected to the automatic transmission 14 to control the shifting of the automatic transmission gears housed within a gear box 48. Notably, the ECU 20 may provide control and monitoring of other vehicle systems not illustrated.

Substantively, the ECU/controller 20 comprises one or more electrical signal outputs to control the operation of one or more respective solenoids of an associated automatic transmission, wherein the said solenoids operatively control respective clutches associated with the automatic transmission; a controller memory comprising a program to control the one or more electrical signal outputs according to one of a set of controller memory stored solenoid calibration data curves; and one or more electrical signal inputs to configure the automatic transmission controller to control the electrical signal outputs according to one of the set of calibration curves.

According to one exemplary embodiment of this disclosure, the set of controller memory stored solenoid calibration curves comprises a first data curve, a second data curve and a third data curve, each curve representing a relatively distinct, proportionally related, solenoid calibration data curve associated with the I-P operating characteristics of one or more respective solenoids.

As will be further described below, the set of controller memory stored calibration curves may comprise an I-P center data curve to operate one or more solenoids within a first range of operating currents to produce a first range of operating pressures, an I-P minus data curve to operate the one or more solenoids within a second range of operating currents to produce a second range of operating pressures, and an I-P plus data curve to operate the one or more solenoids within a third range of operating currents to produce a third range of operating pressures, where the second range of operating currents and pressures are relatively less than the first range of operating currents and pressures, respectively, and the third range of operating currents and pressures are relatively greater than the first range of operating currents and pressures, respectively.

To program the ECU/controller 20, ECU/controller 20 electrical signal inputs $V_{SIG}^+$ and $V_{SIG}^-$ are configured to receive a first voltage signal to program the automatic transmission controller to associate a predetermined solenoid with the I-P minus data curve, a second voltage signal to program the automatic transmission controller to associate a predetermined solenoid with the I-P center data curve, and a third voltage signal to program the automatic transmission controller to associate a predetermined solenoid with the I-P plus data curve.

As illustrated in FIG. 1, the automatic transmission 14 comprises a gear box 48, clutches 40, 42, 44 and 46, solenoid pressure valves 24, 26, 28 and 30, and a hydraulic pump 22. The automatic transmission 14 is operatively connected to the ECU 20 via control lines as shown. The ECU 20 comprises a processor 21 which accesses solenoid I-P (i.e. current-pressure) data 23 to control solenoid pressure control valves 24, 26, 28 and 30 for controlling clutches 40, 42, 44 and 46, respectively. The clutches disengage gears 48 associated with the transmission gear box 48.

To engage/disengage a gear within the gear box 48, the appropriate clutch is controlled via its respective solenoid pressure control valve. For example, to disengage a first gear operatively coupled to clutch 40, the ECU 20 controls input current to the solenoid pressure control valve 24 to supply the appropriate hydraulic pressure to the clutch 40. As is known to those of skill in the art, the ECU 20 determines and commands specific solenoid activated hydraulic pressures based on the pressure determined from an automatic transmission control routine executed by the ECU 20 processor. To properly engage/disengage one or more gears associated with clutches 40, 42, 44, and 46, the commanded solenoid controlled clutch pressure may vary as a function of time to provide smooth shifting of gears, thereby reducing clutch and gear wear.

As discussed briefly in the background section of this disclosure, solenoid calibration data is generated and stored within an ECU 20 to accurately control multiple solenoid pressure control valves for a specific or given ECU pressure command. According to this disclosure and exemplary embodiments described herein, the ECU processor 21 accesses one of a set of I-P data curves 23 associated with a respective solenoid to provide a commanded hydraulic pressure. The I-P data curves 23 are initially electronically stored within the ECU 20 and may be subsequently applied to respective solenoid pressure control valves 24, 26, 28 and 30 during an automatic transmission test routine to measure the performance of the automatic transmission within the tolerances of the solenoids.

With continuing reference to FIG. 1, according to the exemplary embodiment illustrated, the ECU stored set of solenoid I-P data curves 23 comprises an I-P minus data curve, I-P center data curve and I-P plus data curve. Notably, the I-P data curves 23 are distinct and each data curve represents I-P control data for one of three solenoid operating characteristics which represent the range of solenoid performance. For example, I-P center data curve includes solenoid current and pressure control data for a solenoid which is classified as producing an expected amount of pressure for a given current. I-P minus data curve includes solenoid current and pressure control data for a solenoid which is classified as producing less than the expected pressure for a given amount of current, but within tolerances. I-P plus data curve includes solenoid current and pressure control data for a solenoid which is classified as producing more than the expected pressure for a given amount of current, but within tolerances. The testing and calibration of solenoid pressure control valves 24, 26, 28 and 30 is performed during a solenoid setup or calibration routine which may be independent of the automatic transmission operation and testing being described with reference to FIG. 1.

Figure 2B:
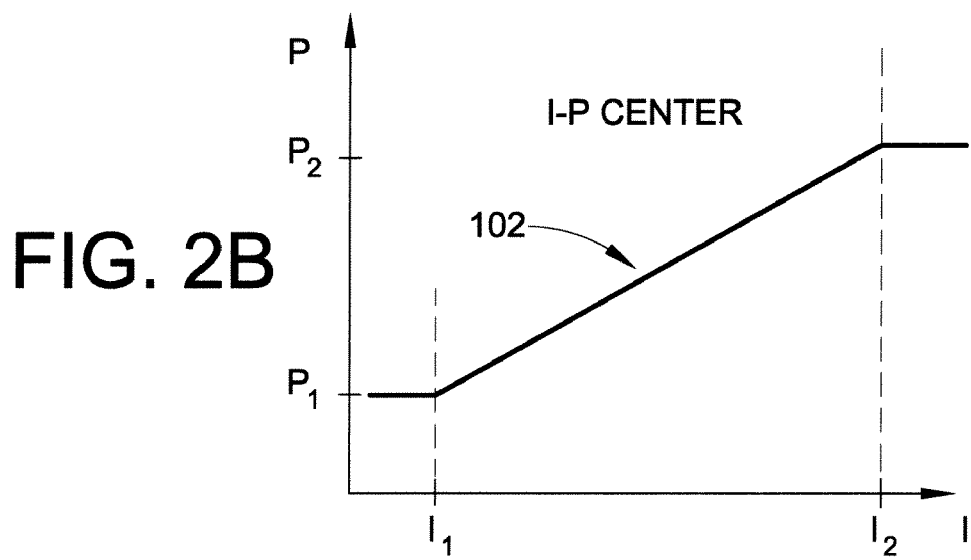
Figure 2C:
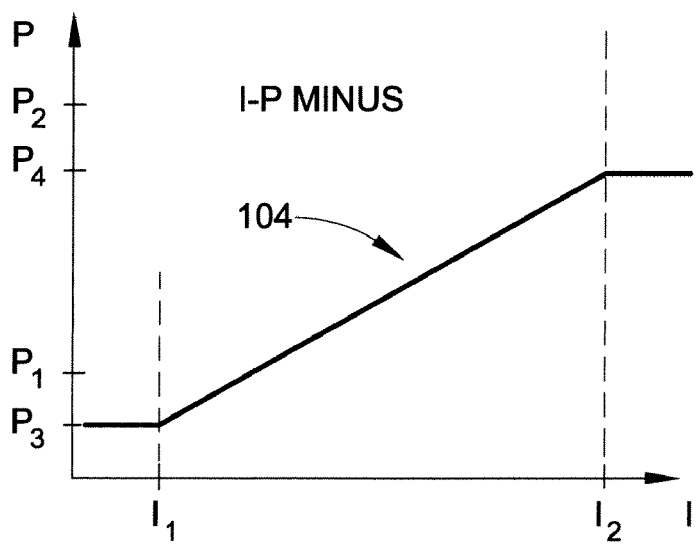

With reference to FIGS. 2A, 2B and 2C, illustrated are a set of I-P data curves according to an aspect of this disclosure. FIG. 2A illustrates an I-P plus data curve 100, FIG. 2B illustrates an I-P center data curve 102 and FIG. 2C illustrates an I-P minus curve 104. Notably, all I-P data curves 100, 102 and 104 are proportionately related and linear. Specifically, I-P plus data curve 100 is shifted upwards relative to I-P center data curve 102 and I-P minus data curve 104 is shifted downward relative to I-P center data curve 102. Moreover, I-P data curves 100, 102 and 104 may be produced by a solenoid calibration means external to the system and method described with reference to FIG. 1. In other words, the I-P data curves are predetermined and stored within the ECU 20 prior to the start of the automatic transmission control system.

The I-P data curves illustrated in FIGS. 2A, 2B and 2C are representative of the range of I-P performance associated with a given type of solenoid-clutch-automatic transmission. More specifically, for a given pressure command from an ECU which produces a specific current, for example $I_1$, a solenoid will produce a minimum pressure of $P_3$ and a maximum pressure of $P_5$ as shown in FIGS. 2C and 2B respectively. Notably, pressure $P_1$ at a solenoid current of $I_1$ is approximately equidistance from $P_3$ and $P_5$ as illustrated in these figures. In other words, the I-P data curves illustrated in FIGS. 2A, 2B and 2C are representative of the operating specifications of the solenoid-clutch-automatic transmission system.

Figure 3A:
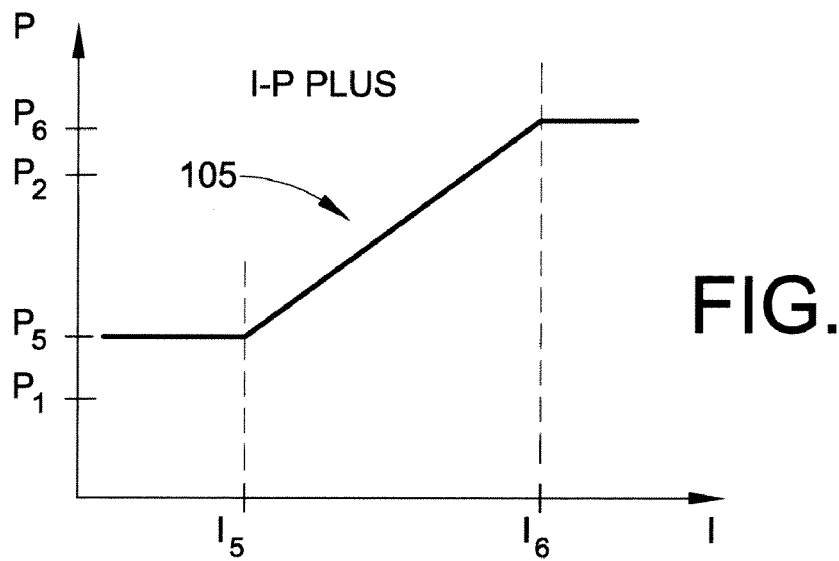
FIGS. 3A, 3B and 3C illustrate a set of solenoid I-P data curves according to an exemplary embodiment of this disclosure.
Figure 3B:
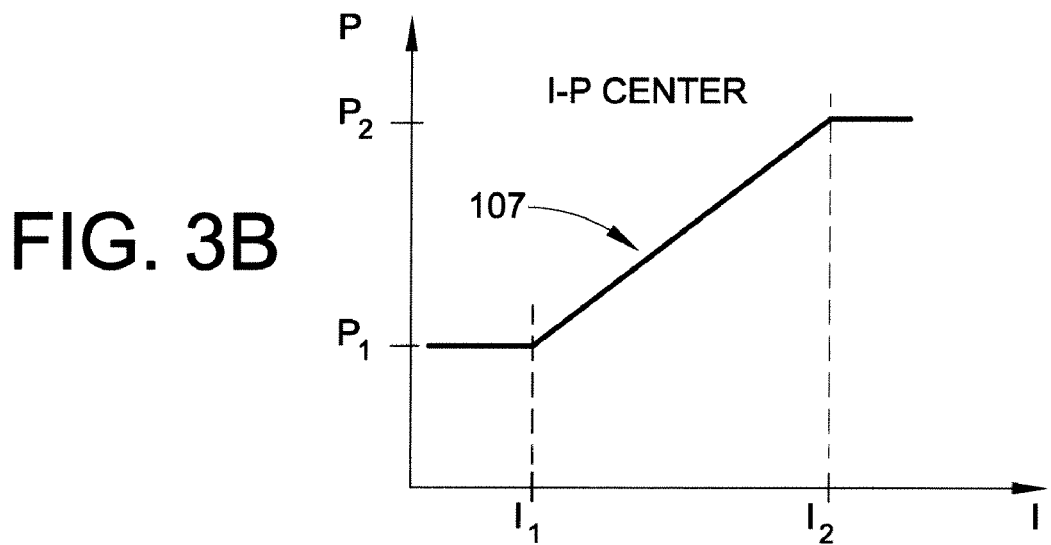
Figure 3C:
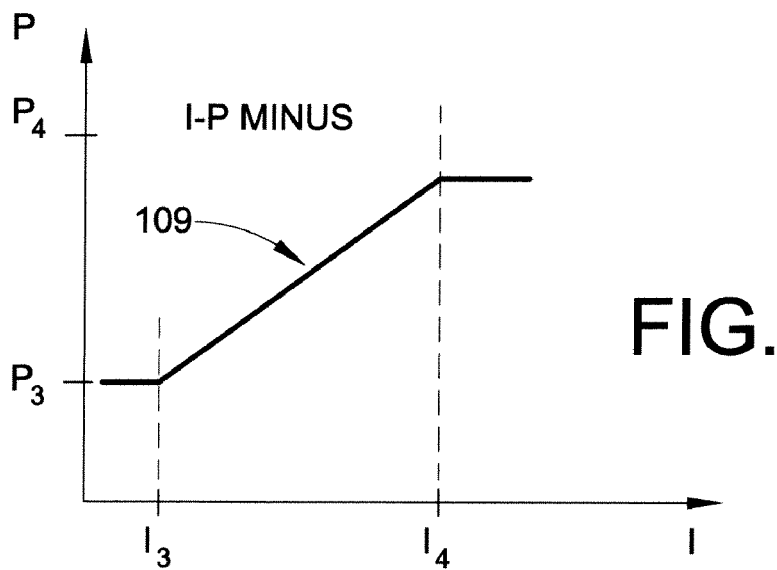

With reference to FIGS. 3A, 3B and 3C, illustrated are I-P curves which are derived from FIGS. 2A, 2B and 2C, and represent data tables stored within the ECU 20 to command/control the solenoid pressure control valves 24, 26, 28 and 30. These I-P data curves provide a means for the ECU to operate one or more solenoids within I-P Center conditions, I-P Plus conditions and/or I-P Minus conditions. By operating the solenoids using the I-P Plus Curve, I-P Center Curve and I-P Minus Curve separately during operation of the automatic transmission, the performance of the automatic transmission can be monitored and measured for the potential range of solenoid actuated pressures associated with the solenoids.

For example, to test the performance of an automatic transmission's ability to shift from first gear to second gear, the ECU commands disengagement of the first gear clutch by controlling solenoid pressure control valve 24 using the ECU stored I-P minus data curve 109 for an initial test, the I-P center data 107 curve for a second test and the I-P plus data curve 105 for a third test. By operating the first gear clutch in this manner, the performance, i.e. shifting smoothness, can be monitored for all possible performance variations of the solenoid-clutch-automatic transmission system. This same procedure/operation is executed by the ECU for all solenoid-clutch devices and shifting sequences associated with the automatic transmission.

Described heretofore is an automatic transmission controller which applies a set of solenoid-clutch calibration data curves for control of an automatic transmission, where the set of solenoid-clutch calibration data curves represents a range of potential I-P solenoid responses associated with a group of similar solenoids.

In operation, the method of operating the ECU and associated automatic transmission comprises (a) storing in the electronic transmission controller a set of distinct I-P data curves associated with solenoid operated pressure control valve I-P operating characteristics for one or more solenoid operated pressure control valves associated with the automatic transmission; and (b) applying a first voltage signal to the electronic controller to associate a first I-P data curve with one or more solenoid operated pressure control valves, applying a second voltage signal to the electronic controller to associate a second I-P data curve with one or more solenoid operated pressure control valves, and applying a third voltage signal to the electronic controller to associate a third I-P data curve with one or more solenoid operated pressure control valves.

Figure 4:
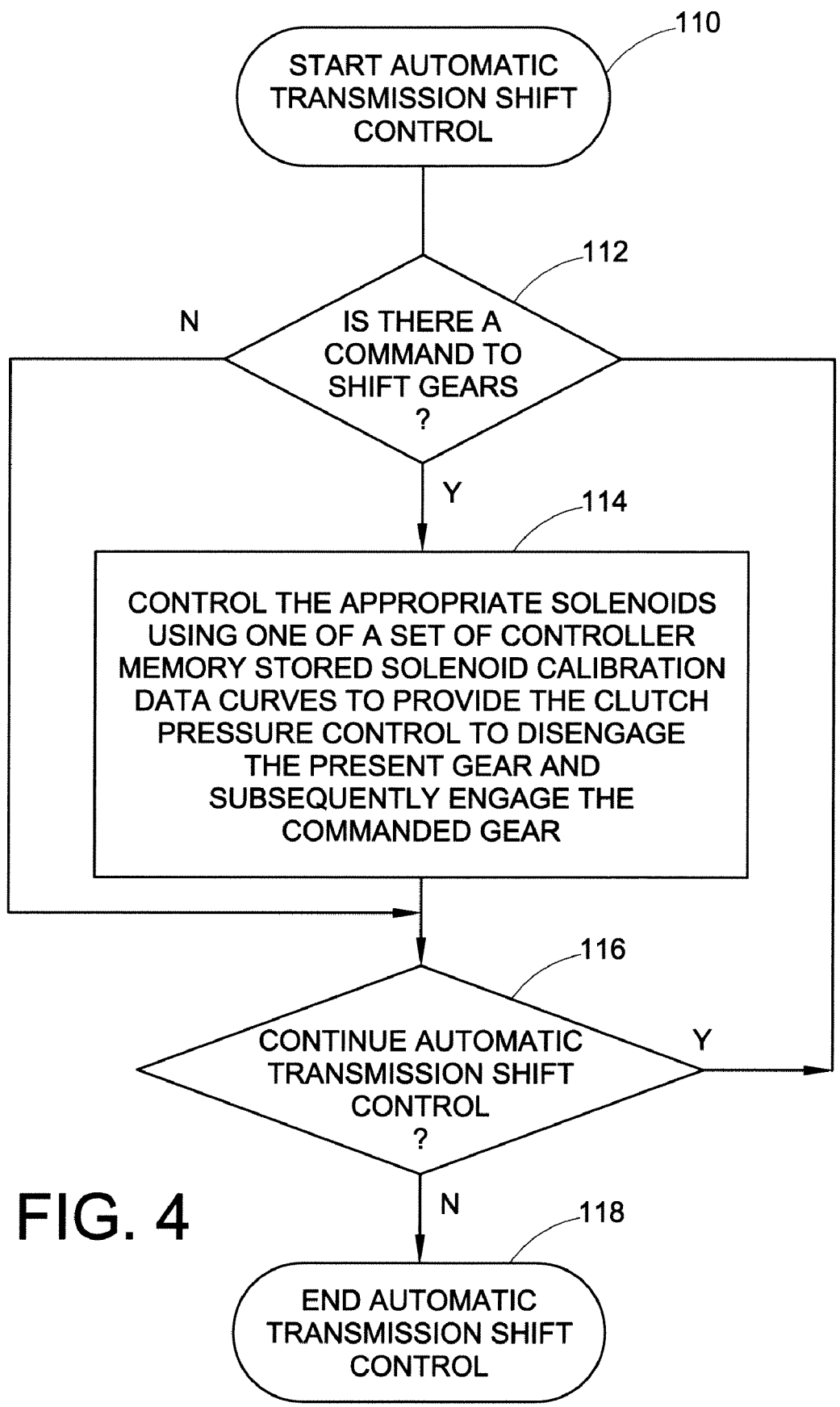
FIG. 4 illustrates a flow chart representing a method of operating solenoids associated with an automatic transmission according to an exemplary embodiment of this disclosure.

With reference to FIG. 4, illustrated is a flow chart representing a method of operating solenoids associated with an automatic transmission according to an exemplary embodiment of this disclosure. This method of operation is executed by the ECU 20 during a normal mode of operation for a vehicle system as illustrated in FIG. 1. In other words, with the vehicle engine 10 running, the solenoid calibration data curves 23 are stored in the ECU 20 and the solenoid pressure control valves (24, 26, 28 and 30) are controlled by respective I-P data curves (23) as previously discussed. Substantively, the electronic control controls the respective solenoids for disengagement and/or engagement of the affected gears by accessing a set of controller memory stored solenoid calibration data curves comprising a first data curve, a second data curve and a third data curve, each curve representing a relatively distinct solenoid calibration data curve associated with the I-P operating characteristics of one or more respective solenoids. According to one exemplary embodiment of the controller the ECU controls the respective solenoids for disengagement and/or engagement of the affected gears by accessing a set of controller memory stored solenoid calibration data curves comprising an I-P center data curve to control one or more solenoids to operate within a first range of operating currents to produce a first range of operating pressures, an I-P minus data curve to operate one or more solenoids within a second range of operating currents to produce a second range of operating pressures, and an I-P plus data curve to operate one or more solenoids within a third range of operating currents to produce a third range of operating pressures, where the second range of operating currents are relatively less than the first range of operating currents and pressures, respectively, and the third range of operating currents and pressures are relatively greater than the first range of operating currents and pressures, respectively.

The method of operation comprises initially starting 110 the automatic shift control routine which is executed by the ECU's 20 processor 21 (step 110). Next, it is determined if there is a command to shift gears 48 associated with the automatic transmission 14 (step 112). If there is a command to shift gears 48, the routine controls the appropriate solenoid, 24, 26, 28 or 30, using one of a set of controller memory stored solenoid curves 23 to provide the appropriate clutch pressure control to disengage the present gear and subsequently engage the commanded gear (step 114). If there is no command to shift gears or step 114 is completed, the routine determines whether or not to continue automatic shift control (step 116). If it is determined that automatic shift control will continue, the routine returns to step 112 and determines if there is a command to shift gears 48. If it is determined to not continue automatic transmission shift control, the routine ends (118).

Described heretofore is an automatic transmission control system and method which sequentially applies each I-P data curve of an I-P data curve representing the range of I-P performance associated with multiple solenoid pressure control valves operatively connected to respective clutches for engagement and disengagement of gears. The following description provides a system and method of controlling an ECU to execute pressure commands associated with each of the I-P data curves, i.e., I-P Minus, I-P Center and I-P Plus.

With reference to FIG. 1, associated with the ECU 20 is a $V_{SIG}{}^+{}_{INPUT}$ and $V_{SIG}{}^-{}_{INPUT}$. These $V_{SIG}$ inputs are read by the ECU and are used to program the ECU 20 to execute solenoid pressure commands associated with one of the three I-P data curves. According to one exemplary embodiment, $V_{CENTER}$=1.5 VDC, $V_{MINUS}$=3.0 VPC and $V_{PLUS}$=4.5 VPC, where $V_{CENTER}$, $V_{MINUS}$ and $V_{PLUS}$ are applied to $V_{SIG}$ input to select the respective I-P data curves for gear shifting. The $V_{SIG}$ voltages may be applied by any voltage generation device which produces the appropriate voltages, for example a pendant type controller which is connected to the ECU and provides a means for an operator to output the appropriate voltages. In practice the voltage may float or vary slightly, so it is preferable to use a voltage range for I-P selection. For example: 0 VDC$<=V_{CENTER}<$1.5 VDC, 1.5 VDC$<=V_{MINUS}<$3.0 VDC, and 3.0 VDC$<=V_{PLUS}<=$4.5 VDC.

In operation, the ECU is commanded to execute a disengagement and engagement of a gear utilizing the I-P data curve specified by the operator via the pendant. For example, if the operator/pendant provide $V_{SIG}$=1.5 VDC, the ECU utilizes I-P center data, etc. Notably, this system and method provide a means for an engineer and/or technician to test the performance of an automatic transmission within the spectrum or range of I-P characteristics associated with the solenoid-clutch devices while continuously running the ECU and transmission.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An automatic transmission controller comprising:
   one or more electrical signal outputs to control the operation of one or more respective solenoids of an associated automatic transmission, wherein the said solenoids operatively control respective clutches associated with the automatic transmission;
   a controller memory comprising a program to control the one or more electrical signal outputs according to one of a set of controller memory stored solenoid calibration data curves; and
   one or more electrical signal inputs to configure the automatic transmission controller to control the electrical signal outputs according to one of the set of calibration curves.

2. The automatic transmission controller according to claim 1, wherein the set of controller memory stored solenoid calibration curves comprises a first data curve, a second data curve and a third data curve, each curve representing a relatively distinct solenoid calibration data curve associated with the I-P operating characteristics of one or more respective solenoids.

3. The automatic transmission controller according to claim 2, wherein the data curves are proportionally related.

4. The automatic transmission controller according to claim 1, wherein the set of controller memory stored solenoid calibration curves represent the I-P operating characteristics of the one or more respective solenoids.

5. The automatic transmission controller according to claim 4, wherein the set of controller memory stored solenoid calibration curves comprises an I-P center data curve to operate one or more solenoids within a first range of operating currents to produce a first range of operating pressures, an I-P minus data curve to operate the one or more solenoids within a second range of operating currents to produce a second range of operating pressures, and an I-P plus data curve to operate the one or more solenoids within a third range of operating currents to produce a third range of operating pressures, where the second range of operating currents and pressures are relatively less than the first range of operating currents and pressures, respectively, and the third range of operating currents and pressures are relatively greater than the first range of operating currents and pressures, respectively.

6. The automatic transmission controller according to claim 5, wherein the I-P minus data curve, the I-P center data curve and the I-P plus data curve are relatively proportional.

7. The automatic transmission controller according to claim 5, wherein the one or more electrical signal inputs are configured to receive a first voltage signal to program the automatic transmission controller to associate a predetermined solenoid with the I-P minus data curve, a second voltage signal to program the automatic transmission controller to associate a predetermined solenoid with the I-P center data curve, and a third voltage signal to program the automatic transmission controller to associate a predetermined solenoid with the I-P plus data curve.

8. A method of operating an electronic transmission controller and associated automatic transmission comprising:
   (a) storing in the electronic transmission controller a set of distinct I-P data curves associated with solenoid operated pressure control valve I-P operating characteristics for one or more solenoid operated pressure control valves associated with the automatic transmission; and
   (b) applying a first voltage signal to the electronic controller to associate a first I-P data curve with one or more solenoid operated pressure control valves, applying a second voltage signal to the electronic controller to associate a second I-P data curve with one or more solenoid operated pressure control valves, and applying a third voltage signal to the electronic controller to associate a third I-P data curve with one or more solenoid operated pressure control valves.

9. The method of operating an electronic transmission controller of a solenoid operated pressure control valve and associated automatic transmission calibrating according to claim 8, wherein the electronic controller is operatively connected to an engine to which the transmission is associated, the method further comprising: (c) applying the said first, second and third voltage signals while the engine is running.

10. The method of operating an electronic transmission controller of a solenoid operated pressure control valve and associated automatic transmission according to claim 9, further comprising: performing step (a) before operating the engine and performing steps (b) and (c) while the engine is operating.

11. A method of operating a solenoid operated pressure control valve for command by an electronic controller comprising:
   (a) starting an automatic transmission shift control routine;
   (b) determining if there is a command to shift gears associated with an automatic transmission; and (c) controlling respective solenoids for disengagement and/or engagement of the affected gears by using one of a set of controller memory stored solenoid calibration data curves to provide the gear clutch pressures, where the set of solenoid data curves are proportionally related.

12. The method of operating a solenoid operated pressure control valve for command by an electronic controller according to claim 11, step (c) further comprising:
controlling the respective solenoids for disengagement and/or engagement of the affected gears by accessing a set of controller memory stored solenoid calibration data curves comprising a first data curve, a second data curve and a third data curve, each curve representing a relatively distinct solenoid calibration data curve associated with the I-P operating characteristics of one or more respective solenoids.

13. The method of operating a solenoid operated pressure control valve for command by an electronic controller according to claim 11, step (c) further comprising:
controlling the respective solenoids for disengagement and/or engagement of the affected gears by accessing a set of controller memory stored solenoid calibration data curves comprising an I-P center data curve to control one or more solenoids to operate within a first range of operating currents to produce a first range of operating pressures, an I-P minus data curve to operate one or more solenoids within a second range of operating currents to produce a second range of operating pressures, and an I-P plus data curve to operate one or more solenoids within a third range of operating currents to produce a third range of operating pressures, where the second range of operating currents are relatively less than the first range of operating currents and pressures, respectively, and the third range of operating currents and pressures are relatively greater than the first range of operating currents and pressures, respectively.

14. An automatic transmission controller comprising:
a means for storing in the electronic controller a set of distinct I-P data curves associated with the solenoid operated pressure control valve I-P operating characteristics for one or more solenoid operated pressure control valves associated with an automatic transmission; and
a means for applying a first voltage signal to the electronic controller to associate a first I-P data curve with one or more solenoid operated pressure control valves, applying a second voltage signal to the electronic controller to associate a second I-P data curve with one or more solenoid operated pressure control valves, and applying a third voltage signal to the electronic controller to associate a third I-P data curve with one or more solenoid operated pressure control valves.

15. The automatic transmission controller according to claim 14, further comprising:
an engine and pressure control valve operatively connected to an automatic transmission; and
a means for applying the said first, second and third voltage signals while the engine is running.

16. The automatic transmission controller according to claim 15, wherein the means for applying the first voltage signal, the second voltage signal and the third voltage signal is performed while the engine is operating.

17. The automatic transmission controller according to claim 15, wherein the means for applying the first voltage signal, the second voltage signal and the third voltage signal is performed while the engine and automatic transmission are operating.

18. An automatic transmission controller comprising:
a means for starting an automatic transmission shift control routine;
a means for determining if there is a command to shift gears associated with an automatic transmission; and
a means for controlling respective solenoids of the automatic transmission for disengagement and/or engagement of the affected gears by using one of a set of controller memory stored solenoid calibration data curves to provide the gear clutch pressures, where the set of solenoid data curves are proportionally related.

19. The automatic transmission controller according to claim 18, the means for controlling the respective solenoids for disengagement and/or engagement of the affected gears further comprising:
a means for accessing a set of controller memory stored solenoid calibration data curves comprising
a first data curve,
a second data curve and
a third data curve, each curve representing a relatively distinct solenoid calibration data curve associated with the I-P operating characteristics of one or more respective solenoids.

20. The automatic transmission controller according to claim 18, the means for controlling the respective solenoids for disengagement and/or engagement of the affected gears further comprising:
a means for accessing a set of controller memory stored solenoid calibration data curves comprising
an I-P center data curve to operate one or more solenoids within a first range of operating currents to produce a first range of operating pressures,
an I-P minus data curve to operate one or more solenoids within a second range of operating currents to produce a second range of operating pressures, and
an I-P plus data curve to operate one or more solenoids within a third range of operating currents to produce a third range of operating pressures,
where the second range of operating currents and pressures are relatively less than the first range of operating currents and pressures, respectively, and the third range of operating currents and pressures are relatively less than the first range of operating currents and pressures, respectively.

* * * * *